(12) United States Patent
Blanchard

(10) Patent No.: US 7,481,714 B2
(45) Date of Patent: Jan. 27, 2009

(54) WHEELED PUTTER

(76) Inventor: Craig Blanchard, 661 White Bluff Dr., #91, Whitney, TX (US) 76692

( * ) Notice: Subject to any disclaimer, the term of this patent is extended or adjusted under 35 U.S.C. 154(b) by 51 days.

(21) Appl. No.: 11/165,192

(22) Filed: Jun. 24, 2005

(65) Prior Publication Data

US 2006/0217213 A1   Sep. 28, 2006

Related U.S. Application Data

(60) Provisional application No. 60/665,082, filed on Mar. 25, 2005.

(51) Int. Cl.
   *A63B 69/36* (2006.01)
(52) U.S. Cl. .................... 473/230; 473/251
(58) Field of Classification Search ......... 473/219–256
   See application file for complete search history.

(56) References Cited

U.S. PATENT DOCUMENTS

| | | | |
|---|---|---|---|
| 3,220,730 A | 11/1965 | Fine | |
| 3,319,964 A | 5/1967 | Steinberg | |
| 3,597,029 A * | 8/1971 | Marcum | 384/461 |
| 3,751,819 A * | 8/1973 | Dixon | 33/389 |
| 3,806,129 A | 4/1974 | Burrows | |
| 4,529,202 A | 7/1985 | Jacobson | |
| 4,565,539 A * | 1/1986 | Cook | 446/462 |
| 4,688,799 A | 8/1987 | Johnson | |
| 5,172,915 A | 12/1992 | Flis | |
| 5,207,721 A | 5/1993 | Lobdell | |
| 5,323,496 A * | 6/1994 | Blair | 4/246.3 |
| 5,527,035 A | 6/1996 | Marshall | |
| 5,577,965 A | 11/1996 | Burgess | |
| 5,603,665 A | 2/1997 | Bryant | |
| 5,643,098 A | 7/1997 | Monahan et al. | |
| 6,547,672 B1 * | 4/2003 | Chough | 473/230 |
| 6,863,617 B2 * | 3/2005 | Park | 473/226 |
| 2004/0259654 A1 | 12/2004 | Failla et al. | |

OTHER PUBLICATIONS

"Arsenal Roller Putter"; www.austads.com/austads/product.asp?s_id=0&dept_id=3700&pf_id=PABBAAABHDMJPFAE&; Feb. 27, 2005.
"Lloyd Rolling Head Putter"; www.earlytech.com/common/show_item.phtml?-375635731; Feb. 27, 2005.

* cited by examiner

*Primary Examiner*—Sabastiano Passaniti
(74) *Attorney, Agent, or Firm*—Richard C. Litman

(57) ABSTRACT

The wheeled putter is a putter using a shrink fit process to secure the putter head to wheels in order to provide a training putter that ensures a uniform putting height above ground. The wheeled putter includes a putting head and a pair of wheels mounted onto the putting head. The wheels each have a bearing assembly mounted in the wheel hubs. The putter head is cooled, thus shrinking the putter head, which is then pressed into the bearing assembly. When returned to room temperature, the putter head is secured directly against the bearing assemblies of the wheel by expansion of the axle shaft against the bearing assembly.

3 Claims, 4 Drawing Sheets

WHEELED PUTTER

CROSS-REFERENCE TO RELATED APPLICATION

This application claims the benefit of U.S. Provisional Patent Application Ser. No. 60/665,082, filed Mar. 25, 2005.

BACKGROUND OF THE INVENTION

1. Field of the Invention

The present invention relates to golf putters, and particularly to a wheeled golf putter.

2. Description of the Related Art

Golf is a sport enjoyed by countless numbers of people, many of whom lack an accurate short game. Inaccurate putting is often the difference in making a quality score in golf. Learning how to correctly putt is an important aspect of the golf game.

Many golfers often scuff their putt, which involves dragging the club head across the putting surface prior to making contact with the ball. Numerous golfing aids used to help the golfer learn how to accurately putt are available on the market. These golfing aids are beneficial, in that they teach the golfer how to move the putter. When the golfing aid is used often, golfers will retain muscle memory and will inherently remember the feeling of the stroke that was done correctly with the training aid when they are using the regular putter.

As muscle memory is an important component in learning an accurate putting stroke, when a wheeled training device is used, it is beneficial for the training device to provide as smooth a roll as possible. It is also important that the device not loosen over time, because precision is necessary to teach the golfer how exactly to hit the ball. Many wheeled training devices require the wheels to be held onto an axle with pins or other such attachment means. Over time, the wheels may loosen, with consequent loss of accuracy of the training device.

Accordingly, there is a need for a wheeled putter that retains the wheels onto the putter securely and does not loosen over time. Thus a wheeled putter solving the aforementioned problems is desired.

SUMMARY OF THE INVENTION

The wheeled putter is a putter using a shrink fit process to secure wheels to the putter head in order to provide a training putter. The wheeled putter includes a putting head and a pair of wheels mounted onto the putting head, with a shaft attached to the putting head. The putting head has a pair of wheel-engaging ends or axles. The wheels each have a bearing assembly disposed in the hub of the wheel.

The shrink fit process is used to provide a secure fit between the putter head and the wheels. The putter head is cooled, thus shrinking the axle shafts. The axles are then pressed into the wheel bearings, and when returned to room temperature, the axle shafts expand, firmly securing the bearing assembly of the wheel to the axle. The bearing assemblies allow for the rotation of the wheels, while providing a tight fit between the wheels and the putter head.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
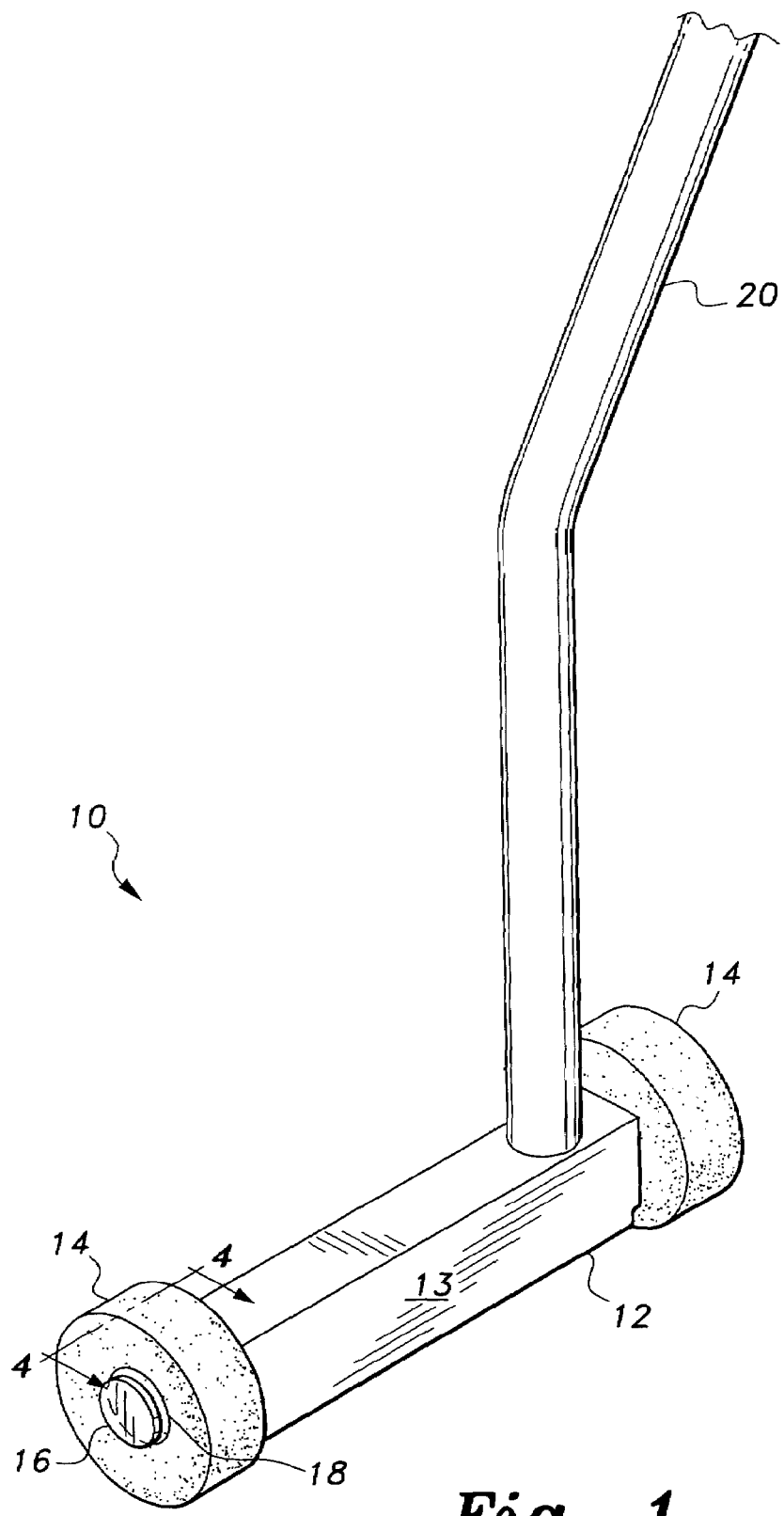
FIG. 1 is a perspective view of a wheeled putter according to the present invention.

The present invention is a wheeled putter that allows an individual to practice his or her putting stroke. The wheeled putter, designated generally as 10 in the drawings, uses a shrink fit process to attach wheels onto the putter.

Referring first to FIG. 1, a perspective view of the wheeled putter 10 is shown. The wheeled putter 10 includes a putting head 12 and a pair of wheels 14 of equal diameter mounted onto the putting head 12. The putting head 12 has an elongated body portion 13 forming a substantially flat upper surface of the putting head 12 and a pair of axles 16 extending from opposing ends of the elongated body portion 13. The wheels 14 each have a bearing assembly 18 disposed in the hub of each of the wheel 14. The wheels 14 are mounted onto the axles 16 at opposing ends of the putting head 12. A shaft 20 is attached to the substantially flat upper surface of the putting head 12 adjacent one of the wheels 14.

In order to facilitate a tight fit between the putter head 12 and the bearing assembly 18 in the wheels 14, the pair of wheels 14 is shrink fit onto the putter head 12. The putter head 12, which is made from metal, is cooled, forcing the metal to contract and the axles 16 to shrink in diameter. The bearing assembly 18 of each of the wheels 14 is then pressed onto each of the axles 16 of the putter head 12. The putter head 12 eventually warms up to room temperature, whereupon the axles 16 expand in diameter, creating a tight fit between the axles 16 and the bearing assemblies 18 of the wheels 14. The result is a high level of contact pressure between the axles 16 and the bearing assemblies 18.

Figure 2:
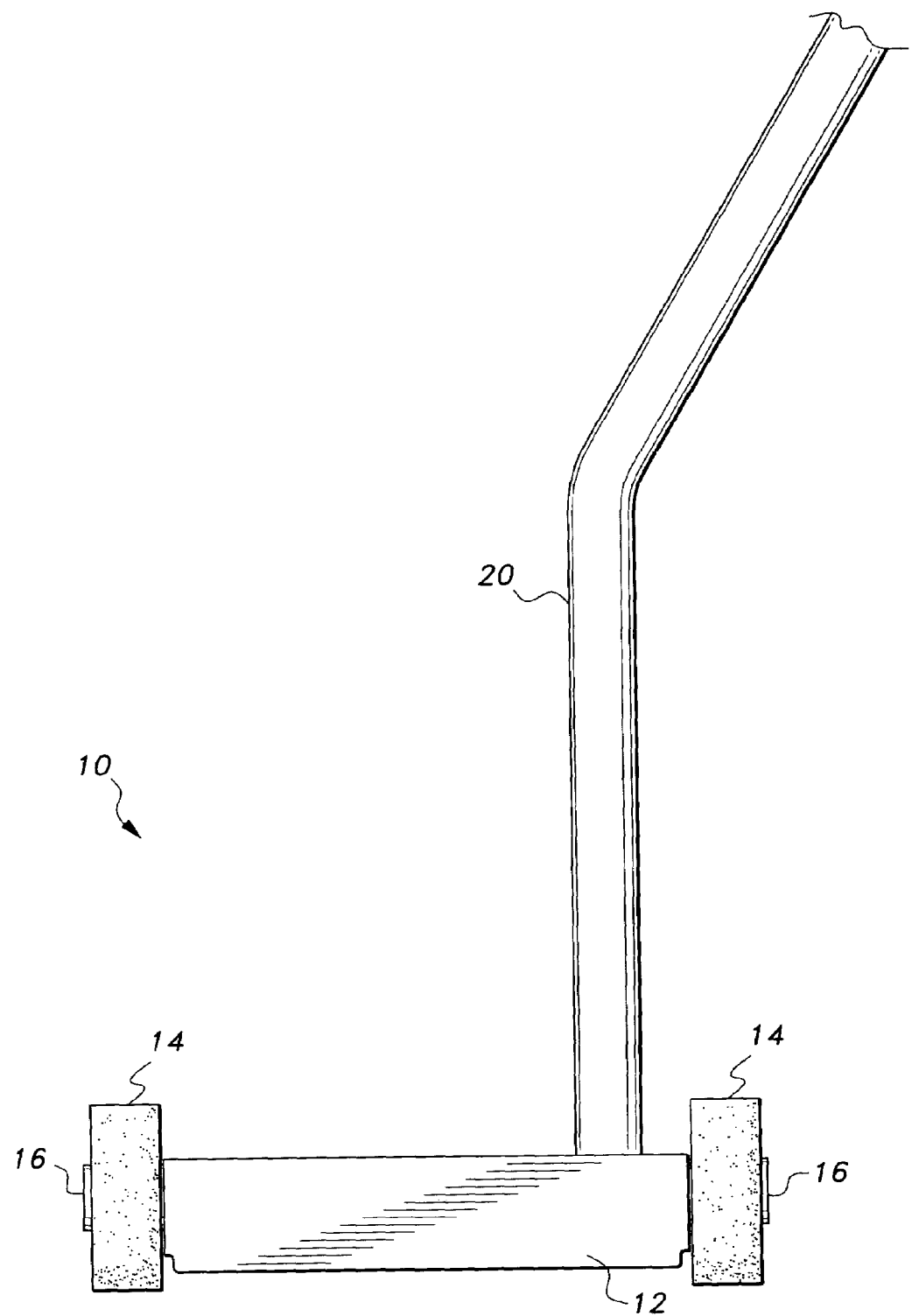
FIG. 2 is a front view of the wheeled putter according to the present invention.

FIG. 2 is a front view of the wheeled putter 10. The putter head 12 is fitted within the hubs of the wheels 14. The putter head 12 is maintained between the wheels 14 so that when the putter 10 is set onto the putting surface, the putter head 12 is approximately one-quarter inch above the putting surface. The secure mounting of the wheels 14 to the putter head 12 ensures that the putter is uniformly held at the same height above ground every time the putter is used with the wheels 14 engaging the ground.

The bearing assemblies 18 in the wheel hubs allow for rotation of the wheels 14 when the wheels roll over the ground. The bearing assemblies 18 may include ball bearings or roller bearings disposed between inner and outer races, or any other type of wheel bearing that permits rotation of the wheels 14 about the axles 16. The tight fit provides a smooth and stable putting stroke when the putter 10 is used.

Figure 3:
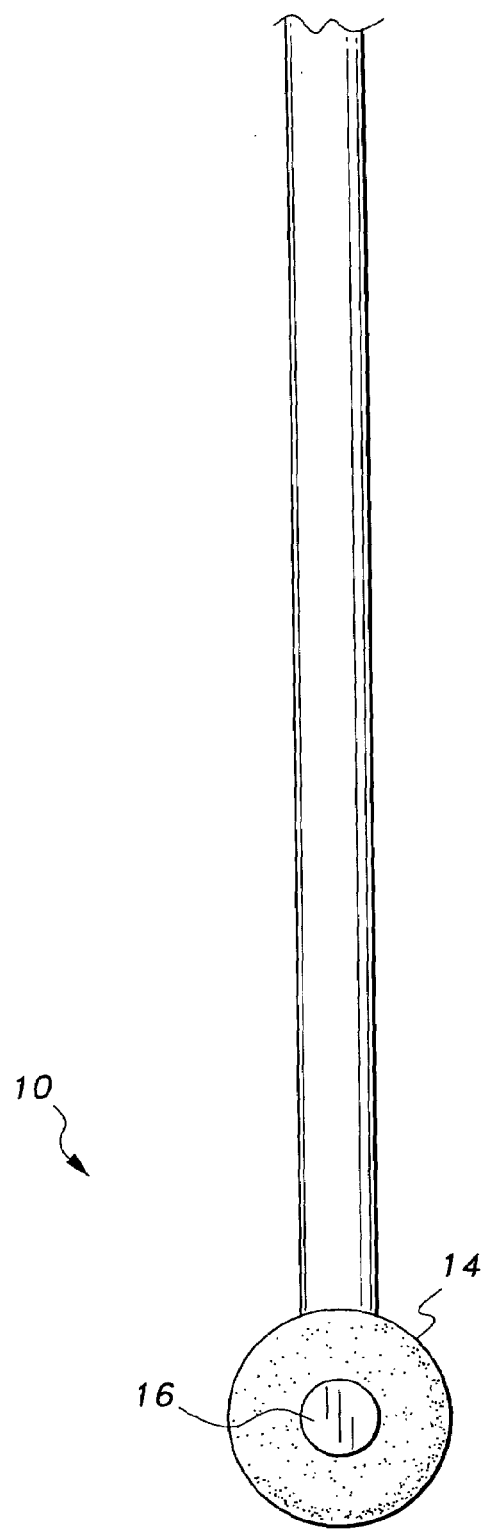
FIG. 3 is a side view of the wheeled putter according to the present invention.

FIG. 3 shows a side view of the wheeled putter 10. The axle 16 mates tightly within the hub of the wheel 14 in order for the wheeled putter 10 to be used without pins or other devices necessary to retain the wheels 14 on the opposing ends of the putter head 12.

Figure 4:
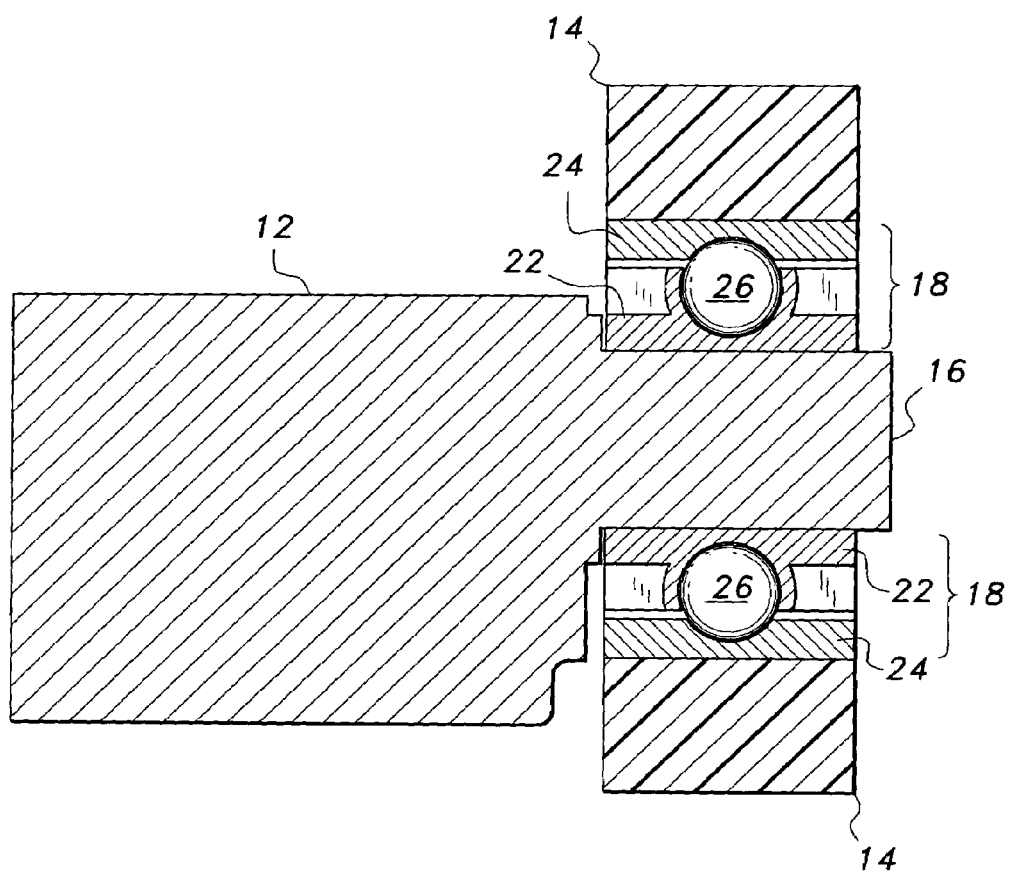
FIG. 4 is a section view along lines 4-4 of FIG. 1.

Turning now to FIG. 4, a section view along lines 4-4 of FIG. 1 is shown. The axle 16 is shown pressed within the bearing assembly 18 in the hub of the wheel 14. The bearing assembly 18 includes an inner race 22, an outer race 24 and a plurality of spherical ball bearings 26 disposed between the inner 22 and outer 24 races. The axle 16 is inserted through the hole defined by the inner race 22, and once the cooled putter head 12 reheats to room temperature, the axle 16 is sealed against the bearing assembly 18, thus providing a secure fit, while allowing the wheel 14 to rotate during use.

It is to be understood that the present invention is not limited to the embodiment described above, but encompasses any and all embodiments within the scope of the following claims.

I claim:

1. A wheeled putter, comprising:

a shaft;

a putting head connected to the shaft, the putting head having an elongated, flat body portion of one-piece construction, and an axle extending from opposing ends of wherein the body portion terminates at opposing ends to integrally form a pair of axles said flat body portion forming a substantially flat upper surface of the putting head; and a pair of wheels of equal diameter, each of the wheels having a hub and a ball bearing assembly mounted in the hub, each of the bail bearing assemblies being shrink fit onto one of the corresponding opposing axles, respectively each of the axles to provide a secure attachment between the putter head and the wheels; said shaft being attached to said substantially flat upper surface adjacent one of said wheels.

2. The wheeled putter according to claim 1, wherein the putting head is made from metal.

3. The wheeled putter according to claim 1, wherein the bearing assembly comprises:

an inner race and an outer race; and a plurality of spherical ball bearings disposed between the inner and outer races.

\* \* \* \* \*